(12) United States Patent
Yamashita

(10) Patent No.: US 7,286,338 B2
(45) Date of Patent: Oct. 23, 2007

(54) ELECTRICAL CONNECTION BOX

(75) Inventor: Hisanobu Yamashita, Mie (JP)

(73) Assignees: Sumitomo Wiring Systems, Ltd., Mie (JP); Autonetworks Technologies, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 288 days.

(21) Appl. No.: 11/092,833

(22) Filed: Mar. 30, 2005

(65) Prior Publication Data

US 2005/0231897 A1    Oct. 20, 2005

(30) Foreign Application Priority Data

Apr. 19, 2004    (JP)    ............................. 2004-123186

(51) Int. Cl.
  *H02B 1/01*    (2006.01)
  *H01R 12/04*    (2006.01)
(52) U.S. Cl. .................. 361/622; 361/752; 439/76.2
(58) Field of Classification Search .................. None
  See application file for complete search history.

(56) References Cited

U.S. PATENT DOCUMENTS

| | | | |
|---|---|---|---|
| 5,814,765 A * | 9/1998 | Bauer et al. ............. | 174/50.54 |
| 6,116,916 A * | 9/2000 | Kasai ........................ | 439/76.2 |
| 6,265,659 B1 * | 7/2001 | Kaiser ........................ | 174/564 |
| 6,341,066 B1 * | 1/2002 | Murowaki et al. .......... | 361/707 |
| 6,430,054 B1 * | 8/2002 | Iwata .......................... | 361/752 |
| 6,437,986 B1 * | 8/2002 | Koshiba ..................... | 361/752 |
| 6,671,173 B2 * | 12/2003 | Ashiya et al. .............. | 361/704 |
| 6,849,943 B2 * | 2/2005 | Thurk et al. ................ | 257/712 |

FOREIGN PATENT DOCUMENTS

JP    A 2003-164039    6/2003

* cited by examiner

*Primary Examiner*—Boris Chérvinsky
(74) *Attorney, Agent, or Firm*—Oliff & Berridge, PLC

(57) ABSTRACT

An electrical connection box includes a plurality of circuit components at least partially overlapped one above the other, being substantially parallel with each other and arranged at a predetermined space each circuit component having a switching member and an electric power conducting path on a substrate; a spacer that retains the substrate; and a connecting member that electrically connects an upper electric power conducting path with a lower electric power conducting path.

5 Claims, 7 Drawing Sheets

# ELECTRICAL CONNECTION BOX

BACKGROUND OF THE INVENTION

1. Field of the Invention

The present invention relates to an electrical connection box.

2. Description of the Related Art

As disclosed in JP-A-2003-164039, known is an electrical connection box constructed with a control circuit substrate, a switching member arrayed on the surface of the control circuit substrate and controlled by the control circuit substrate and an electric power conducting path arrayed on the back of the control circuit substrate and connected with a power source.

SUMMARY OF THE INVENTION

Since a relatively large electric current flows through electric power conducting paths in this type of an electrical connection box, it must be structured to occupy a larger installation space such as broader metal plates. Therefore, a larger number of branch circuits and poles used in electric power conducting paths will inevitably need a larger space for installing electric power conducting paths, resulting in a large-sized control circuit substrate and also a large-sized electrical connection box as a whole.

The present invention has been made on the basis of the above circumstances, with an object of making the electrical connection box smaller.

According to one aspect of the invention, there is provided with an electrical connection box including: a plurality of circuit components at least partially overlapped one above the other, being substantially parallel with each other each circuit component including a substrate having a switching member and an electric power conducting path; a spacer that retains the substrate at a predetermined space; and a connecting member that electrically connects an upper electric power conducting path with a lower electric power conducting path.

One sheet of a substrate can be made smaller because the substrate is divided into plural pieces so that they can be overlapped one above the other, thereby making the electrical connection box smaller as a whole. In addition, the substrates of the circuit component are kept mutually at an approximately parallel form and at a predetermined space, by which the electric power conducting paths can be connected with their counter parts stably.

According to another aspect of the invention, a case accommodating the plurality of circuit components has the spacer.

Since the case acts as a spacer, the structure can be simplified as compared with a case where a special spacer is provided in addition to the case.

According to another aspect of the invention, the connecting member includes a first terminal fixed on the upper electric power conducting path and a second terminal fixed on the lower electric power conducting path. The spacer has a positioning part that positions to the first and second terminals at a normal connecting position.

Since a spacer also gives positioning to the terminals, the structure can be simplified as compared with an instance where a member for giving positioning is provided in addition to the spacer.

According to another aspect of the invention, the connecting member includes: a plurality of first terminals fixed on the upper electric power conducting path; and a plurality of second terminals fixed on the lower electric power connecting channel. The first and second terminals are individually accommodated in a plurality of spaces which is provided within the spacer.

By thus configuration, Plural terminals are individually accommodated into the accommodating space, thereby making it possible to prevent short-circuits between adjacent terminals even when plural terminals fixed on one electric power conducting path are arrayed adjacently.

DECRIPTION OF THE PREFFERRED EMBODIMENTS

Embodiment 1

Figure 1:
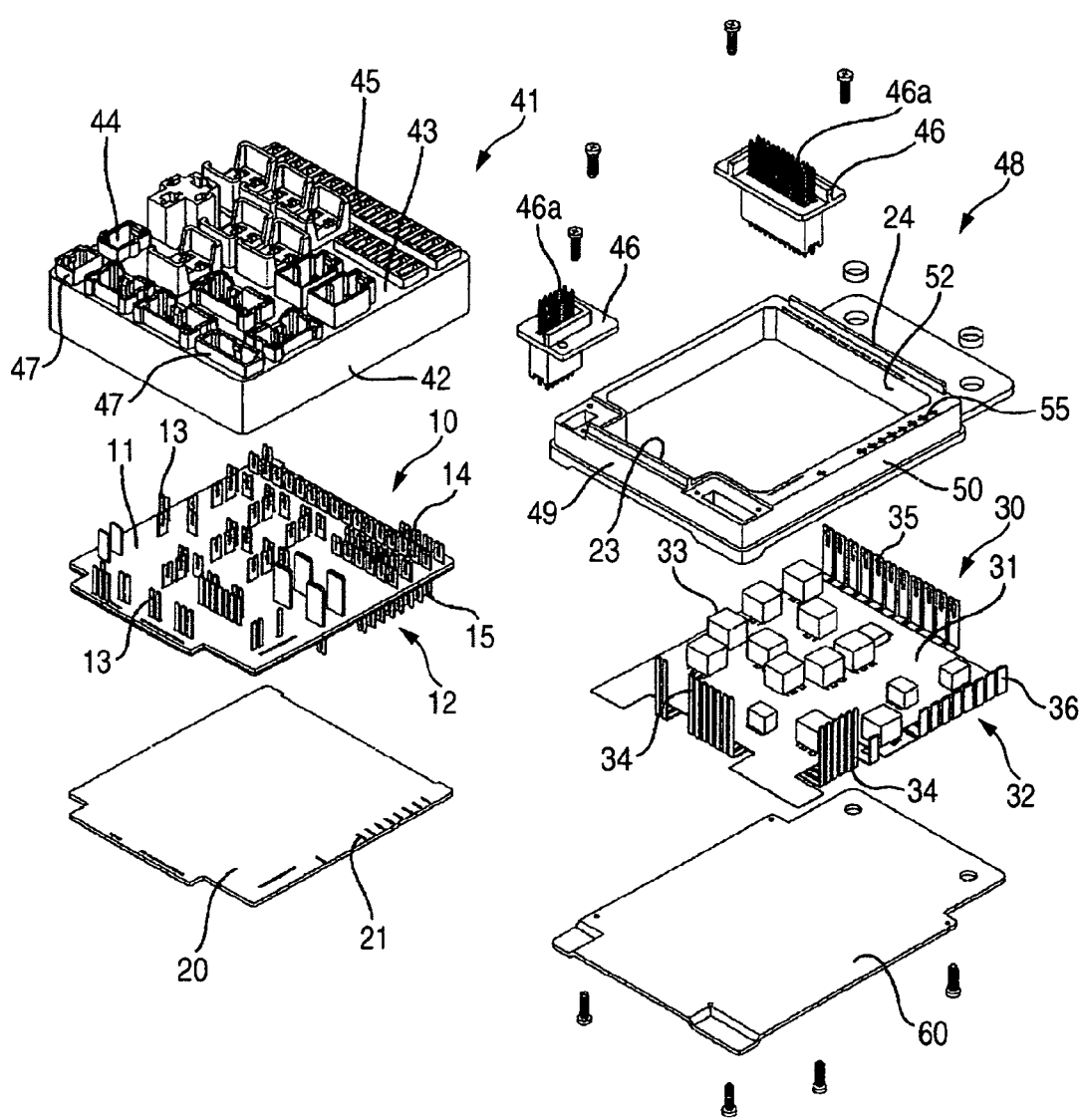
FIG. 1 is an exploded perspective view.
Figure 2:
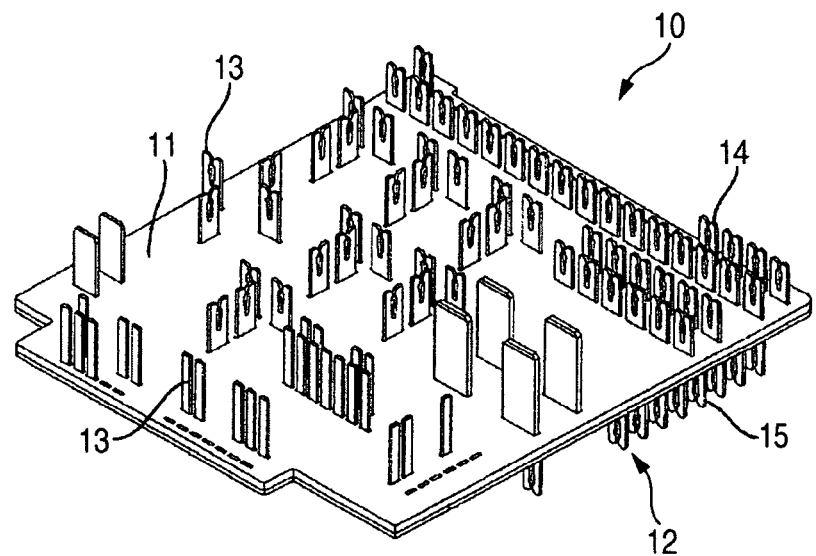
FIG. 2 is a perspective view of the first circuit component.
Figure 3:
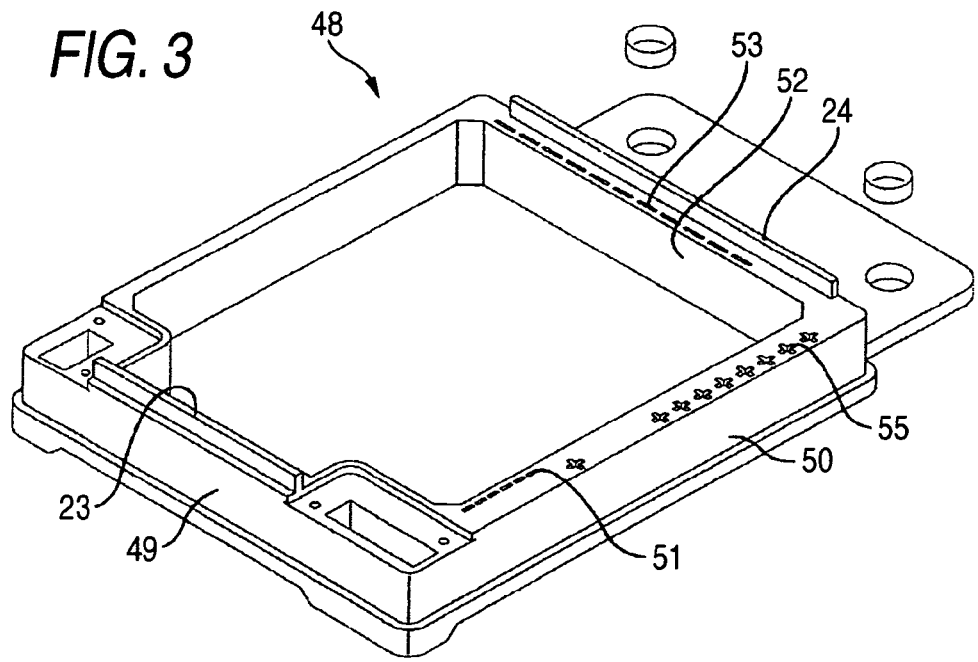
FIG. 3 is a perspective view of the frame of the case.
Figure 4:
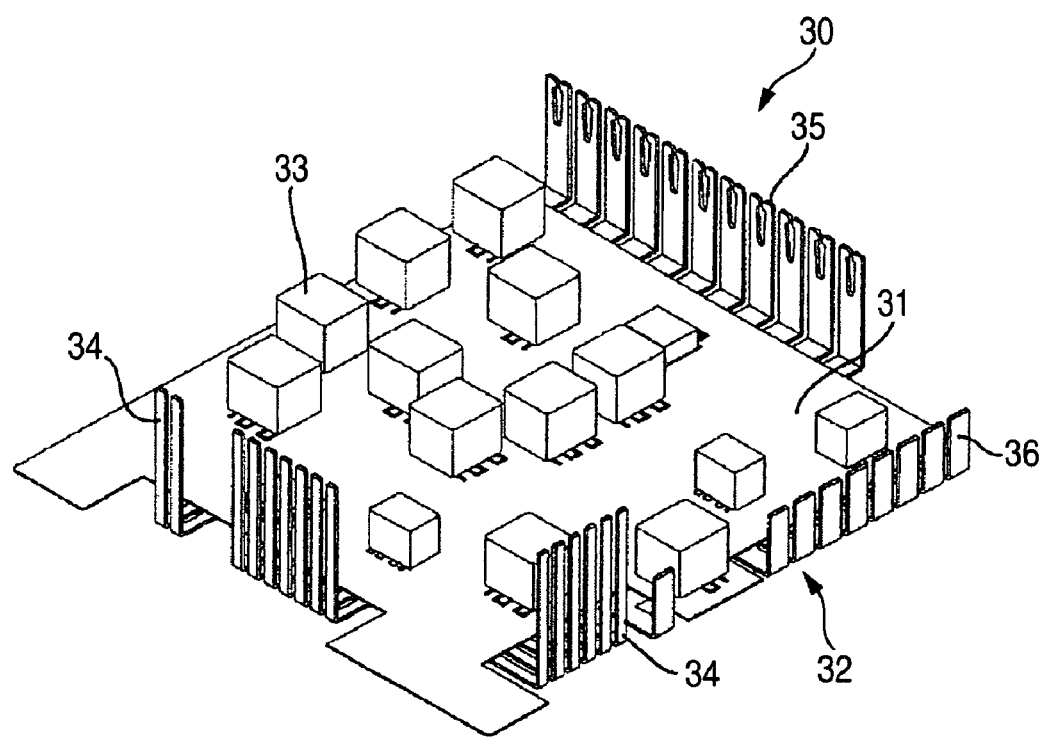
FIG. 4 is a perspective view of the second circuit component.
Figure 5:
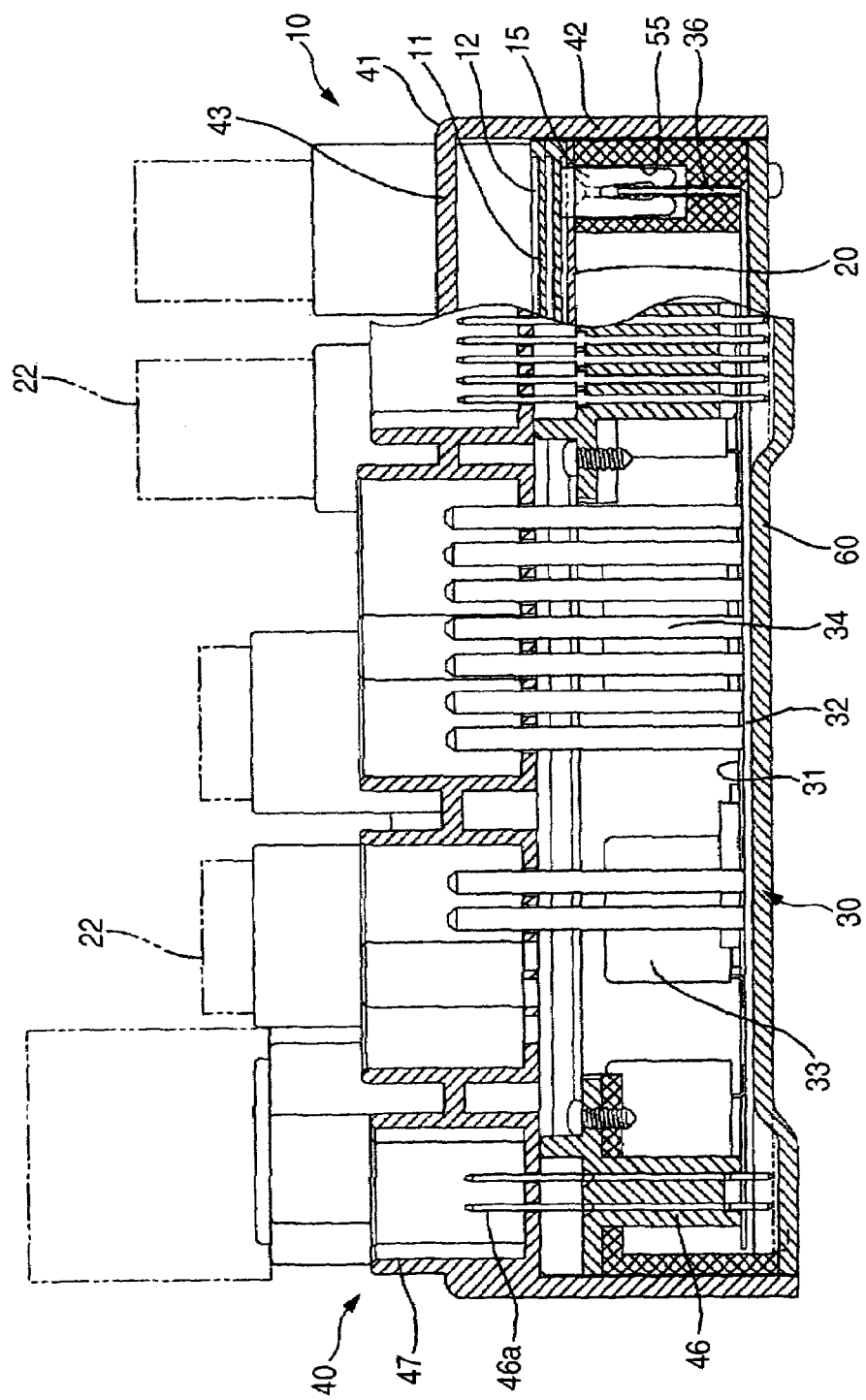
FIG. 5 is a sectional view.
Figure 6:
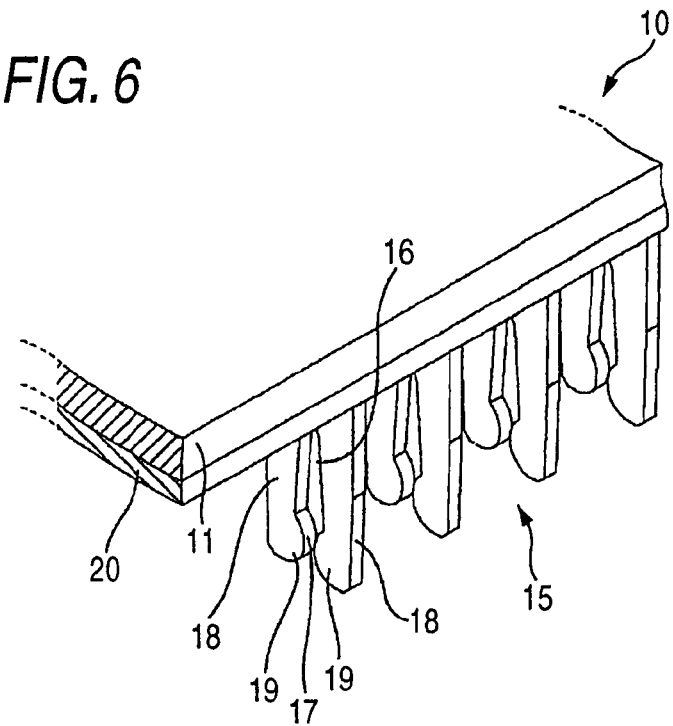
FIG. 6 is a perspective view showing the tuning-fork shaped terminal.
Figure 7:
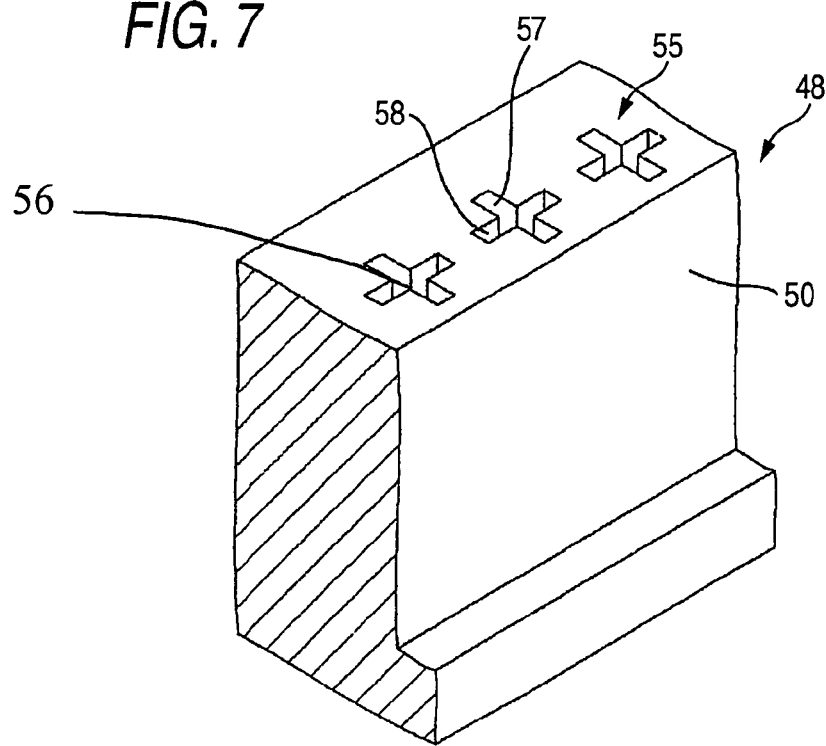
FIG. 7 is a perspective view showing the positioning part.
Figure 8:
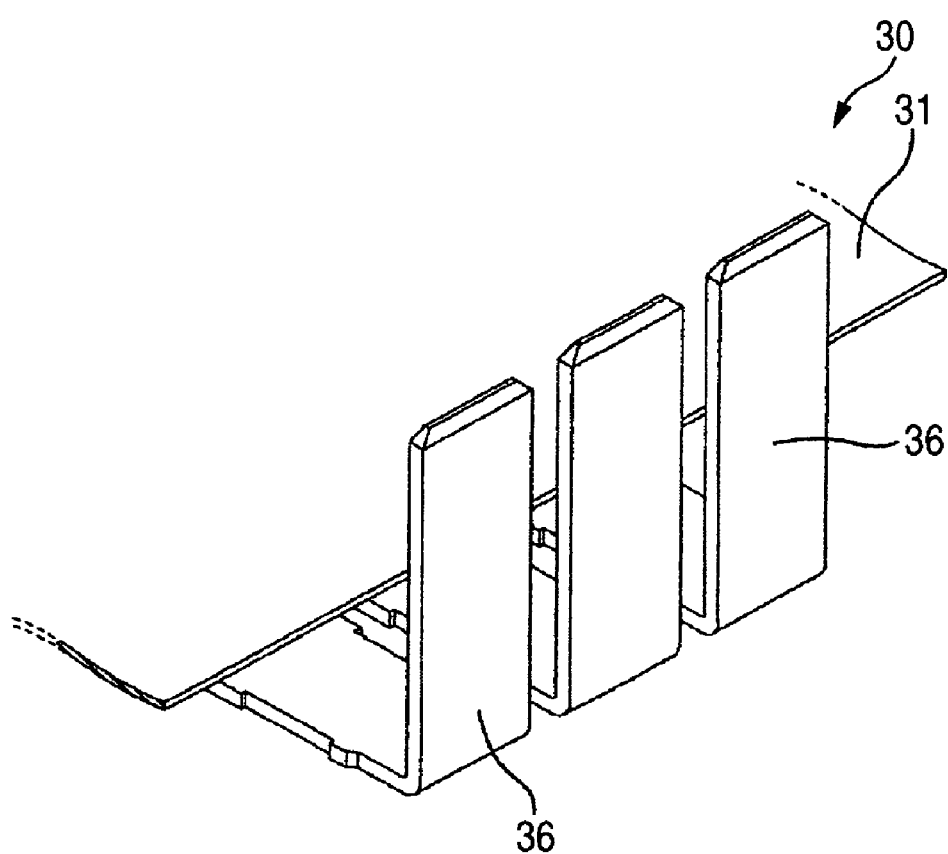
FIG. 8 is a perspective view showing the tab terminal.
Figure 9:
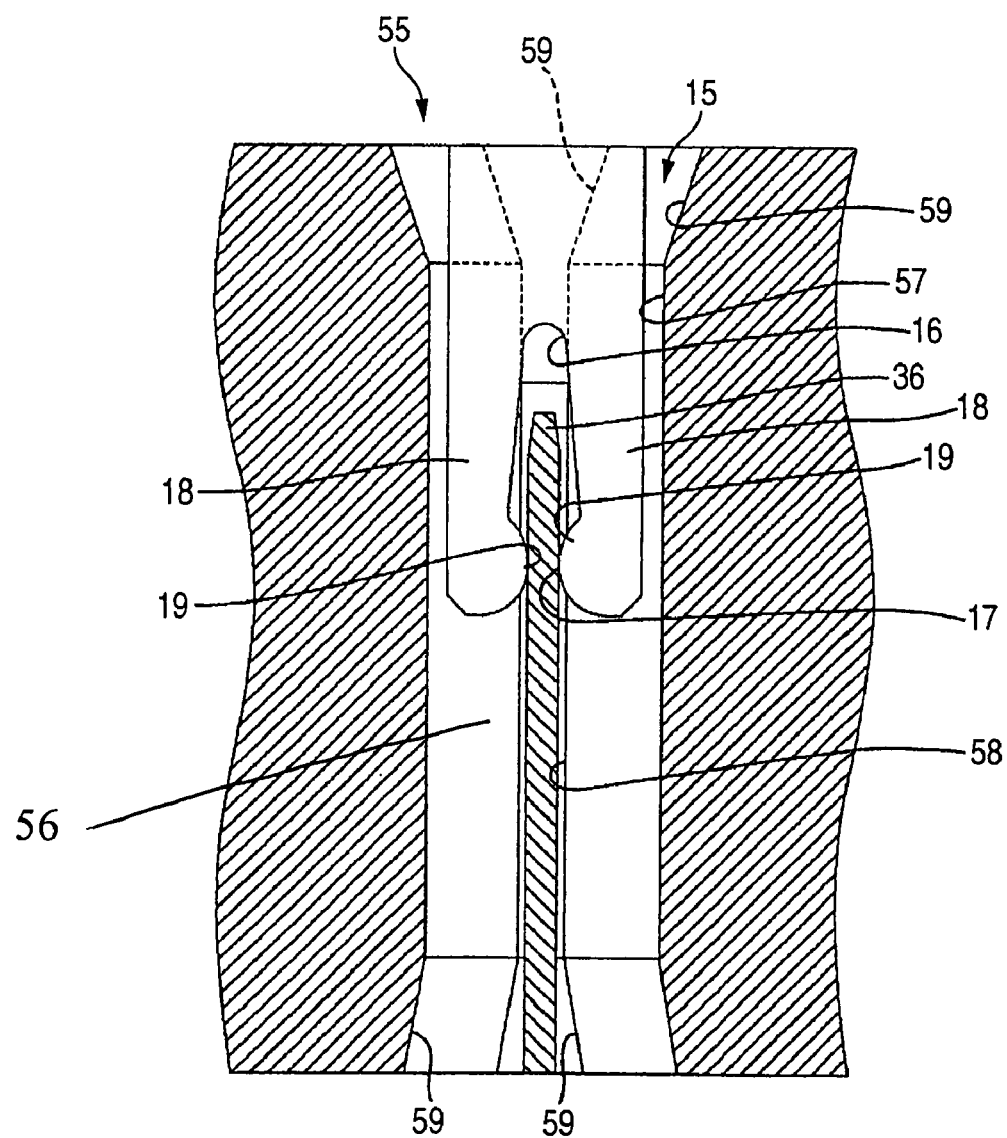
FIG. 9 is a enlarged sectional view showing a state that the tuning-fork shaped terminal is fitted into the tab terminal.

Hereinafter, a first embodiment of the present invention is described by referring to FIG. 1 through FIG. 9. In the electrical connection box of this embodiment, a first circuit component 10 and a second circuit component 30 are accommodated in a case 40 to be overlapped one above the other horizontally.

The first circuit component 10 is provided with an approximately rectangular supporting substrate 11, a first electric power conducting path 12 arrayed along the supporting substrate 11 and a relay (not illustrated) fixed on an upper cover 41 to be described later. The first electric power conducting path 12 configured by plural pass bars made with a thick metal sheet punched out into a predetermined shape. The first electric power conducting path 12 is formed in an integrated form with plural relay terminals 13 penetrating through the supporting substrate 11 and projecting on the upper plane (surface) at an approximately right angle, plural fuse terminals 14 penetrating through the supporting substrate 11 and projecting on the upper plane (surface) at an approximately right angle and plural tuning-fork shaped terminals 15 penetrating downward from the lower plane of the supporting substrate 11 at an approximately right angle.

The tuning-fork shaped terminal 15 is in a vertically-long band plate form (tab shape) and arrayed in a line at a predetermined pitch back and forth along the left edge on the peripheral edge of the supporting substrate 11. The tuning-fork shaped terminal 15 is provided with the notch part 16 which is notched upward from the lower edge facing toward the longitudinal direction (in parallel in the direction that it is fitted into the tab terminal 36). A longitudinal-direction opening of this notch part 16 is made gradually wider from the top to the bottom, except for the lower end part, and made narrower at the admission part 17 on the lower end of the notch part 16. In other words, parts on both the right and the left sides of the notch part 16 at the tuning-fork shaped terminal 15 are a pair of holding strips 18 extended out downward in a cantilevered form. The side edge on the notch part 16 at the lower end part of each holding strip 18 is the guidance part 19 extended out (projected) to the opposite holding strip 18 in a circular form, and the pair of the guidance parts 19 constitute the admission part 17 of the notch part 16.

In addition, insulating plates 20 are overlapped and fastened together on the lower plane of the supporting substrate 11, and an area excluding the terminals 13, 14 and 15 on the first electric power conducting path 12 is held between the insulating plate 20 and the supporting substrate 11. This insulating plate 20 is provided with plural through-holes 21, and the tuning-fork shaped terminal 15 penetrates the through-hole 21, with deflection toward the horizontal direction being regulated. More particularly, the tuning-fork shaped terminal 15 projects downward from the insulating plate 20.

The second circuit component 30 is structurally provided with the approximately rectangular control circuit substrate 31, the second electric power conducting path 32 arrayed along the lower plane of the control circuit substrate 31 and the semiconductor switching element 33 installed on the upper plane (surface) of the control circuit substrate 31. The second electric power conducting path 32 configured by plural pass bars made with a thick metal sheet punched out into a predetermined shape. The second electric power conducting path 32 is formed in an integrated form with plural relay terminals 34 projecting on the upper plane (surface) at an approximately right angle along the peripheral edge of the control circuit substrate 31, plural fuse terminals 35 projecting on the upper plane (surface) at an approximately right angle along the peripheral edge of the control circuit substrate 31 and plural tab terminals 36 penetrating on the upper plane (surface) at an approximately right angle also along the peripheral edge of the control circuit substrate 31.

The tab terminal 36 is in a vertically-long band plate form (tab shape) and arrayed in a line at a predetermined pitch back and forth along the left edge on the peripheral edge of the control circuit substrate 31, that is in a form corresponding to the tuning-fork shaped terminal 15. The upper edge of the tab terminal 36 faces the back and forth direction so as to give a right angle to the lower edge of the tuning-fork shaped terminal 15. Further, the plate thickness dimension of the tab terminal 36 is to be equal to or slightly larger than an opening width (namely, a pitch between the guidance parts 19 of the holding strip 18) of the admission part 17 at the notch part 16 of the tuning-fork shaped terminal 15.

The case 40 is structurally provided with the upper cover 41, the frame 48 and the radiator plate 60.

The upper cover 41 is made with a synthetic resin, being configured by the approximately rectangular encircling wall 42 which encircles the whole circumference of the first circuit component 10 and the second circuit component 30 and the upper plane plate 43 which covers the first circuit component 10 from the top, with the inner space of the upper cover 41 opened downward. The upper plane plate 43 is provided with plural relay fixing parts 44 which are formed in an upward rectangular tube form, the relay terminal 13 of the first electric power conducting path 12 approaches inside the relay fixing part 44, penetrating through the bottom, and the relay (not illustrated) fixed to the relay fixing part 44 is connected with the relay terminal 13. The upper plane plate 43 is also provided with plural fuse fixing parts 45 arrayed in a concave form along the back edge, the fuse terminal 14 of the first electric power conducting path 12 approaches inside the fuse fixing part 45, penetrating through the bottom, and the fuse (not illustrated) fixed to the fuse fixing part 45 is connected with the fuse terminal 14. In addition, the upper plane plate 43 is provided with the tubular fitting part 47 corresponding to the wire harness connector 46 to be described later.

The frame 48 is made with a synthetic resin and in an approximately rectangular shape encircling the whole circumference of the second circuit component 30. Of frame parts in all directions constituting the frame 48, the front edge frame part 49 in front of the frame 48 and the right edge frame part 50 on the right are provided with the through-hole 51 for allowing the relay terminal 34 of the second circuit component 30 to penetrate, and the back frame part 52 on the back is provided with the through-hole 53 for allowing the fuse terminal 35 of the second circuit component 30 to penetrate.

The frame 48 is made with a synthetic resin and available in an approximately rectangular form encircling all the circumference of the second circuit component 30, with both the upper and the lower planes opened (vertically penetrated structure). Of frame parts in all directions constituting the frame 48, the front edge frame part 49 and the right edge frame part 50 respectively in front of and on the right of the frame 48 are provided with the through-holes 51 for allowing the relay terminal 34 of the second circuit component 30 to penetrate, and the back edge frame part 52 at the back is provided with the through-holes 53 for allowing the fuse terminal 35 of the second circuit component 30 to penetrate.

The front edge frame part 49 of the frame 48 is provided with the positioning rib 23 for regulating a relative deflection of the frame 48 toward the front of the first circuit component 10 by allowing the supporting substrate 11 of the first circuit component 10 to contact from the back. Further, the back edge frame part 52 of the frame 48 is provided with the positioning rib 24 for regulating a relative deflection of the frame 48 toward the back and the longitudinal direction of the first circuit component 10 by allowing the supporting substrate 11 of the first circuit component 10 to contact from the front or from both the longitudinal directions.

In addition, the right edge frame part 50 of the frame 48 is provided with plural positioning parts 55 for accommodating the tab terminal 36 and the tuning-fork shaped terminal 15. These positioning parts 55 are structured to penetrate through the right edge frame part 50 vertically or in parallel in the direction that the tuning-fork shaped terminal 15 is fitted into the tab terminal 36, and an inner part of each positioning part 55 is a hole-like space 56. The hole-like space 56 of each positioning part 55 is connected in a non-communicative structure with the hole-like space 56 of other positioning part 55, and hole-like spaces 56 adjacent back and forth are, therefore, partitioned by a wall constituting the right edge frame part 50.

These hole-like spaces 56 are individually available in a cross-like figure, when viewed from the direction that the terminal 15 is fitted into the terminal 36, in other words, the first space 57 formed in a slit shape in the back and forth direction and the second space 58 formed in a slit shape in the longitudinal direction are intersected at an approximately right angle. Of these hole-like spaces 56, the tuning-fork shaped terminal 15 is fitted from above into the first space 57 formed in the longitudinal direction, and the thus fitted tuning-fork shaped terminal 15 is regulated for the deflection made in the back and forth direction or in the longitudinal direction in relation to the frame 48 by contacting with the inner wall of the first space 57, and the notch part 16 of the tuning-fork shaped terminal 15 corresponds with the space in the back and forth direction. Further, the tab terminal 36 is fitted from below into the second space 58 in the back and forth direction in the hole-like space 56, and the thus fitted tab terminal 36 is regulated for the deflection made in the back and forth direction or in the longitudinal direction in relation to the frame 48 by contacting with the inner wall of the second space 58. Inside the hole-like space 56 (positioning part 55), the upper end part of the tab terminal 36 is closely fitted into the notch part 16 of the tuning-fork shaped terminal, by which the first electric power conducting path 12 and the second electric power conducting path 32 are communicatively connected.

The taper-shaped guiding plane 59 is formed on opening edges of upper and lower ends of the hole-like space 56. Thus, even if the terminals 15 and 36 are placed into the hole-like space 56 at a slightly deviated position when the tuning-fork shaped terminal 15 and the tab terminal 36 are fitted into the hole-like space 56, the terminals 15 and 36 make contact with the guiding plane 59, by which the deviated position of the terminals 15 and 36 in the frame 48 can be corrected and the terminals 15 and 36 are guided into the hole-like space 56 without fail.

In addition, a peripheral edge of the insulating plate 20 of the first circuit component 10 is placed on the upper plane of the frame 48, and such placement makes it possible that the supporting substrate 11 of the first circuit component 10 is overlapped with the control circuit substrate 31 of the second circuit component 30 one above the other at a predetermined space and mutually in a parallel position.

The wire harness connector 46 is fixed from above to the both right and left ends of the front edge frame part of the frame 48, and the lower end part of the terminal fitting 46*a* of the connector 46 is connected to the control circuit substrate 31 of the second circuit component 30. The upper end part of the terminal fitting 46*a* of the connector 46 approaches into the tubular fitting part 47 of the upper cover 41 in preparation for connecting with the wire harness connector (not illustrated) and the terminal fitting (not illustrated).

The radiator plate 60 is made with an approximately rectangular metal plate and fixed to the frame 48 in such a way to block an opening of the lower plane. This radiator plate 60 is electrically insulative to the lower plane of the second electric power conducting path 32 of the second circuit component 30 and fastened via a thin sheet high in heat conductivity (not illustrated) so that heat generated on application of electric current to the second electric power conducting path 32 can be released outside the case 40 via the radiator plate 60.

The lower plane of the frame 48 is adhered to the upper plane of the radiator plate 60 via a water-proof seal layer (not illustrated) in a state where the case 40 is assembled and the second circuit component 30 (including the switching element 33) is accommodated into a space constituted with the frame 48 and the radiator plate 60. Then, the peripheral edge part of the insulating plate 20 of the first circuit component 10 is placed on the upper plane of the frame 48, and positioned by the positioning ribs 23 and 24 in a state of regulating a relative deflection toward the back and forth or the longitudunal direction. The above placement and the positioning structure make it possible that the supporting substrate 11 of the first circuit component 10 is overlapped one above the other with the control circuit substrate 31 of the second circuit component 30 at a predetermined space and mutually in a parallel form, interference of the switching element 33 with the supporting substrate 11 (insulating plate 20) is avoided and the tuning-fork shaped terminal 15 is connected to the tab terminal 36 at a normal position. Further, an inner wall of the encircling wall 42 of the upper cover 41 is fitted into an outer circumference of the frame 48 in a substantially adhered manner. Above the upper cover 41 is covered by the protective cover (not illustrated) for protecting the relays 22, fuses and connectors.

As explained above, this embodiment comprises the first circuit component 10 in which the supporting substrate 11 is provided with the relay 22 and the first electric power conducting path 12, the second circuit component 30 in which the control circuit substrate 31 is provided with the second electric power conducting path 32 and the switching element 33, the frame 48 having the function of a spacer for retaining the supporting substrate 11 and the control circuit substrate 31 so that they can be overlapped one above the other mutually at an approximately parallel form and at a predetermined space and a connecting member (tuning-fork shaped terminal 15 and tab terminal 36) for connecting the upper first electric power conducting path 12 with the lower second electric power conducting path 32 in a communicative manner. Since a substrate is divided into plural pieces so as to be overlapped one above the other, one sheet of the substrate (supporting substrate 11 and control circuit substrate 31) can be made smaller (smaller in area), thus making it possible to reduce the whole dimension of the electrical connection box. Further, the supporting substrate 11 and the control circuit substrate 31 are kept mutually in an approximately parallel form and at a predetermined space, by which the electric power conducting path 12 and the electric power conducting path 32 can be connected stably.

In the electrical connection box according to this embodiment, since the frame 48 of the case 40 for accommodating the two circuit components 10 and 30 acts as a spacer, the structure can be simplified as compared with a case where a special spacer is provided in addition to the case 40.

As a member of connecting the electric power conducting channel 12 with the channel 32 in a communicative manner, the tuning-fork shaped terminal 15 is provided on the upper first electric power conducting channel 12, the tab terminal 36 is also provided on the lower second electric power conducting channel 32, and the positioning part 55 for positioning the two terminals 15 and 36 at a normal connecting site is provided on the frame 48. Therefore, since the frame 48 can positions the terminals 15 and 36, the structure can be simplified as compared with a case where a special positioning member is provided in addition to the frame 48.

The tuning-fork shaped terminal 15 and the tab terminal 36, which connects the electric power conducting channels 12 and 32, are provided so as to be adjacent to each other in a plural number. Plural tuning-fork shaped terminals 15 are individually accommodated into plural accommodating spaces 56 made in the frame 48, and plural tab terminals 36 are also individually accommodated into plural accommodating spaces 56, thereby making it possible to prevent short-circuits between the tuning-fork shaped terminals 15 and also short-circuits between adjacent tab terminals 36.

As described above, this embodiment has the first circuit component 10 in which the first electric power conducting channel 12 is arrayed along the supporting substrate 11, the second circuit component 30 in which the second circuit component 30 is arrayed along the control circuit substrate 31, and the case 40 accommodating these two circuit components in such a way that they can be overlapped one above the other and mutually in an approximately parallel form, wherein the tuning-fork shaped terminals 15 of the first electric power conducting channel 12 are fitted into the tab terminals 36 of the second electric power conducting channel 32 one above the other so that they can be connected, and the frame 48 of the case 40 is provided with the positioning part 55 for regulating deflection of the irrespective terminals 15 and 36 toward the direction (back and forth or longitudinal direction) intersecting at the vertical direction (direction that the terminal 15 is fitted into the terminal 36). The positioning part 55 makes it possible to give positioning to a plurality of the tuning-fork shaped terminals 15 and a plurality of the tab terminals 36 at the same time, and also makes it possible to fit a plurality of the tuning-fork shaped terminals 15 into a plurality of the tab terminals 36 at the same time (all together). Also, the positioning part 55 is provided on the case 40 for accommodating the circuit components 10 and 30, thereby eliminating the necessity for a special positioning member 55.

In addition, both of the tuning-fork shaped terminal 15 and the tab terminal 36 are in a plate form (tab shape), and the tab terminal 36 is fitted into the notch part 16 formed on the tuning-fork shaped terminal 15 so that these terminals can be connected. The respective terminals 15 and 36 are available in a plate form and, therefore, simplified in structure. Further, one of the terminals (tuning-fork shaped terminal 15) is provided with the notch part 16, in to which another terminal (tab terminal 36) is fitted, thereby resulting in a simplified structure where the terminals 15 and 36 are fitted respectively into their counterparts.

A plurality of the tuning-fork shaped terminals 15 and a plurality of the tab terminals 36 are adjacently arrayed in a line in the back and forth direction. In this embodiment, a wall partitioning each hole-like space 56 constituting the positioning part 55 is structured to exist between the terminals, thus making it possible to avoid short-circuits between the terminals, without providing a special short-circuit preventive member. Further, short-circuits between the terminals can be prevented more assuredly because a part at which the tuning-fork shaped terminal 15 is fitted into the tab terminal 36 is accommodated into the hole-like space 56 of the positioning part 55.

Other Embodiments

This invention shall not be restricted to the embodiment described by referring to the above description and figures, but, for example, includes the following embodiments in the technical field of the invention. In addition, the invention can be executed in various modifications other than the examples shown below without deviating from the scope of the present invention.

(1) In the above embodiment, the frame of the case also acts as a spacer. However, a special spacer may be provided in addition to the case.

(2) In the above embodiment, a positioning part for giving positioning to the terminal of the upper electric power conducting path and the terminal of the lower electric power conducting path is provided on the frame (spacer). However, the positioning part may be provided independently in addition to the frame.

(3) In the above embodiment, the terminal is connected inside the frame (spacer). However, the terminal may be connected outside the frame.

(4) In the above embodiment, both upper and lower terminals are in a male shape (plate form). However, the terminals shall not be restricted to a male shape but include various cases in which one terminal in an external shape can be fitted into another terminal in an internal shape or one terminal in a round pin shape can be fitted into another terminal in a tubular shape.

(5) In the above embodiment, both upper and lower terminals are formed in an integrated form with the electric power conducting path. However, the terminals may be separated from the electric power conducting path.

(6) In the above embodiment, the notch part is formed only on one terminal. However, a notch part may be formed on both upper and lower terminals.

(7) In the above embodiment, the notch part is in a shape extending in parallel with the direction that one terminal is fitted into another terminal. However, a notch part and a terminal on which the notch part is formed may be at an approximately right angle to the direction that one terminal is fitted into anther terminal.

(8) In the above embodiment, both upper and lower terminals are positioned. However, either the upper or lower terminal may be positioned.

(9) In the above embodiment, the positioning part (accommodating space) is provided on the frame encircling the lower circuit component. However, the positioning part may be provided on the upper cover encircling the upper circuit component.

(10) In the above embodiment, the positioning part (accommodating space) is a communicative hole-like space. However, the positioning part maybe available in various shapes such as a wall, rib and projection.

(11) In the above embodiment, the upper circuit component is provided with relays as a switching member and the lower circuit substrate is provided with semiconductor switching elements as a switching member. The above-embodiments of the invention may be applicable to an electrical connection box wherein the upper circuit component is provided with semiconductor switching elements and the lower circuit component is provided with relays, an electrical connection box wherein both upper and lower circuit components are provided with relays and an electrical connection box wherein both upper and lower circuit components are provided

(12) In the above embodiment, an explanation is made about a case where the circuit components are two. The embodiments of the present invention are also applicable to an electrical connection box where three or more circuit components are overlapped. In this case, another circuit component maybe held between two circuit components where one terminal is fitted into another terminal.

(13) In the above embodiment, terminals are arrayed along the peripheral edge of the substrate. However, the terminals may be arrayed at an area other than the peripheral edge of the substrate (area closer to the center of the substrate). In this case, where the electric power conducting path is on the opposite side of a terminal in relation to the substrate, The terminal may be in a structure penetrating through the substrate or extending from the peripheral edge of the substrate to the center. The case is also provided with a connecting part to connect the outer frames together, on which a positioning part may be provided.

(14) In the above embodiment, both the first space and the second space of the positioning part (accommodating space) are in a structure penetrating through the whole case area. However, the first space into which the tuning-fork shaped terminal is fitted from above may be in a non-communicative structure, with only the upper plane opened, and the second space into which the tab terminal is fitted from below may be in a non-communicative structure, with only the lower plane opened.

(15) In the above embodiment, an accommodating space for the tuning-fork shaped terminal and the tab terminal also acts as a positioning part for giving positioning to these terminals. However, the accommodating space dose not need to have the positioning function.

(16) In the above embodiment, a moisture-preventive agent may be coated to the narrow pitch part on the substrate and a potting agent may be injected into the substrate.

(17) In the above embodiments, the radiator panel 60 may be a heat radiating panel a heat spreader panel, and a heat transfer panel.

(18) In the above embodiments, the substrates 11, 30 may be configured by a printed circuit board.

What is claimed is:

1. An electrical connection box comprising:
   a plurality of circuit components at least partially overlapped one above the other, being substantially parallel with each other, each circuit component including a substrate having a switching member and an electric power conducting path;
   a spacer that retains the substrate at a predetermined space; and
   a connecting member that electrically connects an upper electric power conducting path with a lower electric power conducting path via at least one through-hole in the spacer.

2. An electrical connection box according to claim 1, wherein a case accommodating the plurality of circuit components has the spacer.

3. An electrical connection box according to claim 1, wherein the connecting member includes a first terminal fixed on the upper electric power conducting path and a second terminal fixed on the lower electric power conducting path, and
   wherein the spacer has a positioning part that positions to the first and second terminals at a normal connecting position.

4. An electrical connection box according to claim 1, wherein the connecting member includes:
   a plurality of first terminals fixed on the upper electric power conducting path; and
   a plurality of second terminals fixed on the lower electric power connecting channel, and
   wherein the first and second terminals are individually accommodated in a plurality of spaces which is provided within the spacer.

5. An electrical connection according to claim 1, wherein the substrate is configured by a printed circuit board.

* * * * *